United States Patent [19]

Takamizawa et al.

[11] 4,075,598
[45] Feb. 21, 1978

[54] ULTRASONIC WAVE TRANSMITTING AND RECEIVING APPARATUS

[75] Inventors: Kinya Takamizawa, Yokohama; Einoshin Itamura, Tokyo; Kazuhiro Iinuma, Yokohama, all of Japan

[73] Assignee: Tokyo Shibaura Electric Co., Ltd., Kawasaki, Japan

[21] Appl. No.: 678,758

[22] Filed: Apr. 21, 1976

[30] Foreign Application Priority Data

Apr. 25, 1975 Japan .................................. 50-50350

[51] Int. Cl.² .............................................. G01S 9/66
[52] U.S. Cl. .................................................. 340/1 R
[58] Field of Search ........................ 340/1 R, 3 A, 15

[56] References Cited

U.S. PATENT DOCUMENTS

| 3,166,731 | 1/1965 | Joy | 340/15 |
| 3,918,025 | 11/1975 | Koshikawa et al. | 340/1 R |
| 3,919,683 | 11/1975 | Itamura et al. | 340/1 R |

Primary Examiner—Richard A. Farley
Attorney, Agent, or Firm—Oblon, Fisher, Spivak, McClelland & Maier

[57] ABSTRACT

Provided is an ultrasonic wave transmitting and receiving apparatus comprising a plurality of electro-acoustic conversion elements linearly arranged on a flat plane, means for selectively delaying an electrical signal being supplied to or an electrical signal being supplied from the electro-acoustic conversion element so that the ultrasonic wave beams emitted respectively from the electro-acoustic conversion elements may be substantially deflected and scanned to such an extent that the centers of the beams do not intersect each other within a range of field to be examined, a receiver for receiving the ultrasonic wave beam reflected within the field range, through the electro-acoustic conversion elements and the delay means, and means for displaying a picture image of an object to be examined in accordance with an electrical signal from the receiver by using equidistant and parallel scanning lines.

12 Claims, 8 Drawing Figures

ULTRASONIC WAVE TRANSMITTING AND RECEIVING APPARATUS

This invention relates to an ultrasonic wave transmitting and receiving apparatus so designed that the ultrasonic wave beams emitted from a plurality of electro-acoustic conversion elements may be scanned in a linear fashion and deflected in a sector fashion within a range of field in which object to be examined exists.

Through allowing the ultrasonic wave pulse beams emitted from the electro-acoustic conversion elements to enter into an object to be examined and receiving the return echoes from those portions of the object which are different in acoustic impedance, the interior state of the object can be known from the resulting reception signals. Through performing this operation with respect to every portion of the object, substantially the whole interior state thereof can be known. This method is known as an ultrasonic wave tomography.

Conventionally, various types of apparatuses are contemplated as the ultrasonic wave transmitting and receiving apparatus possessed of scanning functions used for the execution of said ultrasonic wave tomography. For example, there is an ultrasonic wave transmitting and receiving apparatus having a number of sufficiently small electro-acoustic conversion elements previously arranged on the same flat plane in a linear form and so designed that a prescribed number of ones of the conversion elements may be simultaneously energized in their arrangement direction and energized in turn while being electrically displaced one by one. This type of apparatus, however, has the drawbacks that since the interval between the ultrasonic wave beams allowed to enter into the object falling within a range of visual field is substantially the same as that between the arranged electro-acoustic conversion elements, a number of small electro-acoustic conversion elements must be densely provided in order to increase the resolution of the apparatus, which provides difficulties in manufacturing an electro-acoustic conversion element array and simultaneously causes an increase in number of the leads, switches, etc. to be attached to the array.

Accordingly, it is the object of the invention to provide an ultrasonic wave transmitting and receiving apparatus capable of scanning by ultrasonic wave beams an object within a range of field at intervals each smaller than that between electro-acoustic conversion elements, and simultaneously not only decreasing the number of the electro-acoustic conversion elements, leads, switches, etc. but also simplifying the circuits involved and in addition increasing the resolution of the apparatus.

According to one aspect of this invention, there is provided an ultrasonic wave transmitting and receiving apparatus comprising an N number of electro-acoustic conversion elements arranged on a flat plane, selectively connecting means for successively energizing each of an M ($M < N$) number of electro-acoustic conversion elements to transmit ultrasonic waves, means for deflecting ultrasonic wave beam transmitted from said M number of electro-acoustic conversion elements by relatively delaying the input supplied to the M number of elements so that the ultrasonic wave beams emitted respectively from said electro-acoustic conversion elements may be substantially deflected and scanned to such an extent as not to intersect each other within a main range of visual field, means for generating an electrical signal in accordance with the received ultrasonic wave reflected from within the range of visual field, and means for displaying images in accordance with the electrical signal generated from the last-mentioned means by using equidistant and parallel scanning lines.

According to another aspect of this invention, there is provided an ultrasonic wave transmitting and receiving apparatus comprising a plurality of electro-acoustic conversion elements linearly arranged on a flat plane, means for selectively delaying a transmitting electrical signal being supplied to said electro-acoustic conversion elements so that the ultrasonic wave beams emitted respectively from said electro-acoustic conversion elements may be substantially deflected and scanned to such an extent as not to intersect each other within a main range of visual field, means for selectively connecting the transmitting electrical signal passed through the delaying means to a selected number of adjacent ones of said plurality of electro-acoustic conversion elements, receiving means including a receiver for receiving the ultrasonic wave beam reflected from an object falling within said field range, through the electro-acoustic conversion elements, to produce a receiving signal, means for delaying the received signals obtained from the respective electro-acoustic conversion elements by the same delay time as in the transmitting operation, and means for displaying a picture image of said object in accordance with a receiving electrical signal from said receiver by using equidistant and parallel scanning lines.

This invention can be more fully understood from the following detailed description when taken in conjunction with the accompanying drawings, in which.

Figure 1:
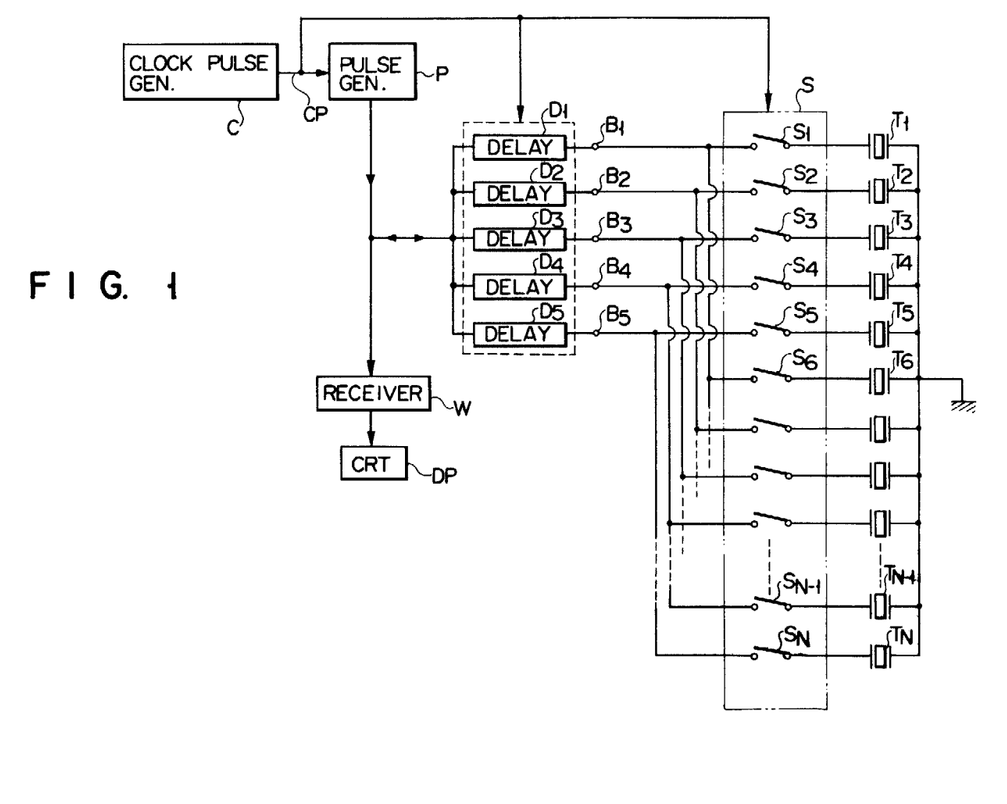
FIG. 1 is a block circuit diagram for explaining the principle of the invention.

Referring to FIG. 1, the clock pulse generator C is fed to a transmitting pulse generator P, and simultaneously supplied as a control signal to delay circuits $D_1$ to $D_5$ and also to a switching circuit S. The delay circuits $D_1$ to $D_5$ are so constructed that the length of delay time of the transmitting pulse introduced from the transmitting pulse generator P and of the received pulse through the electro-acoustic conversion elements may be varied into five stages in a specified sequential order in accordance with the clock pulse from the generator C. For example, in the case of the delay time ranging from 0 to 32 nsec, the delay circuits $D_5$ to $D_1$ are so designed as to delay said transmitting pulse by the lengths of 0 nsec, 8 nsec, 16 nsec, 24 nsec and 32 nsec, respectively. Accordingly, when it is assumed that the delay time length of the delay circuit $D_1$ is set at 32 nsec, the circuits $D_2$, $D_3$, $D_4$ and $D_5$ are set at 24 nsec, 16 nsec, 8 nsec and 0 nsec, respectively. With respect to the next transmitting pulse from the generator P and to the next reflected pulse, the circuits $D_2$, $D_3$, $D_4$, $D_5$ and $D_1$ are set at 32 nsec, 24 nsec, 16 nsec, 8 nsec and 0 nsec, respectively. In this way, the five-stage delay time control of the delay circuits $D_1$ to $D_5$ is repeatedly carried out.

The outputs from the delay circuits $D_1$ to $D_5$ are supplied into the switching circuit S through terminals $B_1$ to $B_5$. The switching circuit S selectively sends out the received transmitting pulse into an N number of electro-acoustic conversion elements $T_1$, $T_2$, ..., $T_N$ and selectively sends out the reflected pulse received through the elements $T_1$ to $T_N$ to the delay circuits, and is composed of an N number of electronic switches $S_1$, $S_2$, ..., $S_N$ and a control section as later described which so operates that the switches $S_1$, $S_2$, ..., $S_N$ may be turned on for each five successive switches in accordance with the clock pulse from the generator C and each time this clock pulse is supplied into the circuit S, electrically displaced one by one in their arrangement direction. The input sides of the switches $S_1$, $S_2$, ..., $S_N$ are classified on every fifth switch so as to permit the whole thereof to be divided into five groups, said groups being connected to the terminals $B_1$ to $B_5$, respectively. The first group is composed of the switches $S_1$, $S_6$, $S_{11}$, ..., and the second group is composed of $S_2$, $S_7$, $S_{12}$, .... Note that in FIG. 1 a reference note W is a receiver for receiving the return echo from an object falling within a range of visual field through the electro-acoustic conversion elements $T_1$ to $T_N$ and the delay circuits $D_1$ to $D_5$ to produce a reproduction signal, and that the signal from this receiver W is displayed as a picture image on a display device DP such as that composed of a CRT.

The operation of the apparatus having such a construction as shown in FIG. 1 will now be explained. Assume first that the range of visual field to be examined is l; the center-to-center distance of adjacent two of the elements is d; and the velocity of sound passing through an object to be examined is v. Then, the delay time $t_1$ of the delay circuit $D_1$ is set at $t_1 = (4d^2)/(2lv)$. Similarly, the delay times $t_2$, $t_3$, $t_4$ and $t_5$ of the delay circuits $D_2$, $D_3$, $D_4$ and $D_5$ are set at $t_2 = 3d^2/2lv$, $t_3 = 2d^2/2lv$, $t_4 = d^2/2lv$ and $t_5 = 0$, respectively, so as to relatively have a time length difference of $d^2/2lv$. In the above-mentioned example, this $d^2/2lv = 8$ nsec.

Figure 2:
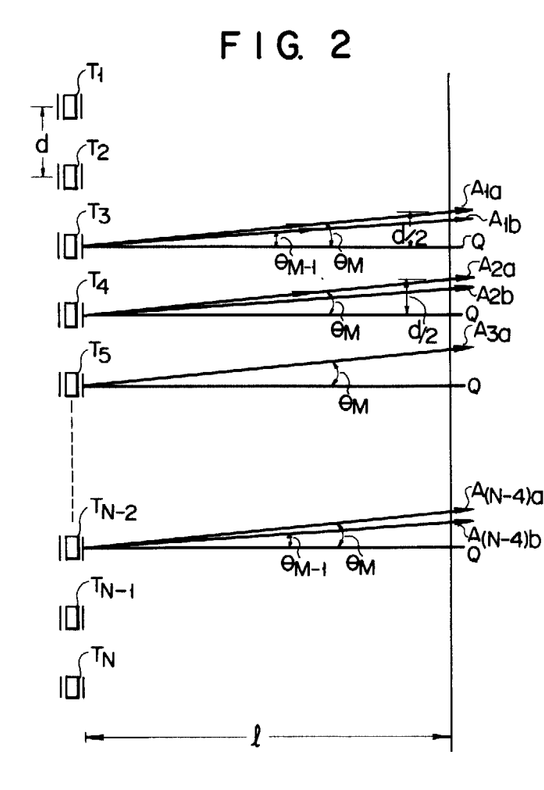
FIGS. 2 and 3 each show an ultrasonic wave beam emission pattern for explaining the operation of the circuit of FIG. 1.

When under this condition, the clock pulse generator C is driven, clock pulses at specified intervals are sent out from the generator C and transmitting pulses at specified intervals are generated from the pulse generator P which receives said clock pulses as input signals. When the first clock pulse is generated from the generator C, the delay circuit $D_1$ delays its received transmitting pulse by, for example, 32 nsec, and the delay circuits $D_2$, $D_3$, $D_4$ and $D_5$ delay that transmitting pulse by 24 nsec, 16 nsec, 8 nsec, and 0 nsec, respectively. Upon receipt of said first clock pulse, only the switches $S_1$ to $S_5$ of the switching circuit S are closed, so that the delayed transmitting pulse is introduced into the electro-acoustic conversion elements $T_1$ to $T_5$, respectively, through the terminals $B_1$ to $B_5$. Namely, the element $T_5$ is first energized and thereafter, in 8 nanoseconds, the element $T_4$ is energized. Similarly, each time 8 nanoseconds elapse, the elements $T_3$, $T_2$ and $T_1$ are energized in turn. As a result of the elements $T_1$ to $T_5$ being energized upon receipt of the transmitting pulse subject to time delay, the ultrasonic wave beams sent out from the elements $T_1$ to $T_5$ is inclined, as shown in FIG. 2, in a direction upwardly inclined by an angle of QM with respect to a straight line Q equivalently intersecting the transmitting wave front of a center one $T_3$ of the five elements $T_1$ to $T_5$. Namely, the ultrasonic wave beam $A_1$ is emitted in said inclined direction. This beam $A_1$ is reflected by the object within the field to be examined of the apparatus and is received again by the elements $T_1$ to $T_5$ and added together for conversion into an electrical signal to be received into the receiver W through the delay circuits $D_1$ to $D_5$. When the received-beam signal is passed through the delay circuits $D_1$ to $D_5$, it is subject to the same time delay as in transmission. Therefore, the five receiving signals sent out from the delay circuits $D_1$ to $D_5$ into the receiver W are in phase with respect to the wave reflected in the opposite direction to the direction of ultrasonic beam $A_1$ and are entered into the receiver W as a composite signal. The signal received into the receiver W is transmitted into the display device DP composed of a CRT, whereby a picture image of the object according to the ultrasonic wave beam $A_1$ is displayed.

Next, when the second clock pulse is sent out from the generator C, the delay circuit $D_2$ is so changed over as to give a delay time of 32 nsec, and the delay circuits $D_3$, $D_4$, $D_5$ and $D_1$ are so changed over as to give delay times of 24 nsec, 16 nsec, 8 nsec and 0 nsec, respectively. Simultaneously, only the switches $S_2$ to $S_6$ of the switching circuit S are turned on, so that the electro-acoustic conversion elements $T_2$ to $T_6$ are energized by said second transmitting pulse. In this case, the element $T_6$ is initially energized and the element $T_2$ is finally energized. Therefore, as equivalently shown in FIG. 2, an ultrasonic wave beam $A_2$ parallel to the beam $A_1$ is emitted from the element $T_4$ at a distance d from the beam $A_1$. Similarly, when the third clock pulse is sent out from the generator C, an ultrasonic wave beam $A_3$ is equivalently emitted from the element $T_5$ at an angle of deflection of $\theta_M$. Similarly, equivalent ultrasonic wave beams $A_4$ to $A_{(N-4)}$ are emitted from the elements $T_6$ to $T_{(N-2)}$ at the same angle of deflection of QM.

When the equivalent ultrasonic wave beam $A_{(N-4)}$ is sent out from the electro-acoustic conversion element $T_{(N-2)}$, the switching circuit S is returned, upon receipt of the next clock pulse, to the same condition as attained when said first clock pulse is sent out from the generator C. On the other hand, the largest length of delay time of the delay circuits $D_1$ to $D_5$ becomes smaller than 32 nsec, for example, becomes 28 nsec, and the delay time thereof is varied and divided in units of seven nanoseconds into five stages up to 0 nanosecond, inclusive. As a result, after one cyclical operation, the equivalent ultrasonic wave beam $A_{1b}$ emitted from the element $T_3$ in accordance with the first clock pulse from the generator C has an angle of deflection of $\theta_{M-1}$ smaller than that $\theta_M$ of the beam $A_1$. Similarly, the beams $A_{2b}$ to $A_{(N-4)b}$ which are parallel to the beam $A_{1b}$ and the distances between which are each d are emitted from the elements $T_4$ to $T_{(N-2)}$, respectively.

In this way, the ultrasonic wave beams equivalently emitted from the elements $T_3$ to $T_{(N-2)}$ can be varied from the angle of deflection of $\theta_M$ over the center line Q to the angle of deflection of $-\theta_M$ by varying the largest length of delay time of the delay circuits $D_1$ to $D_5$. Thus, as shown in FIG. 3, that portion of the examination field which corresponds to the element-to-element's distance d can be subject to fine beam scanning.

Figure 3:
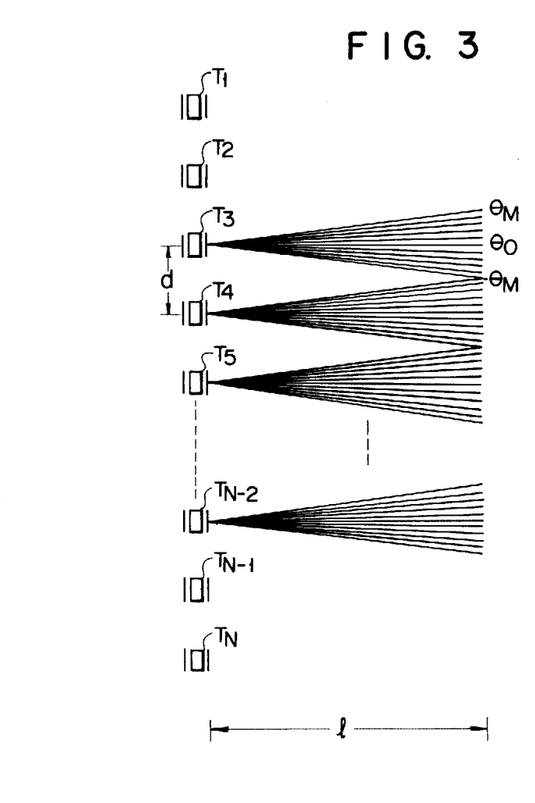
Figure 4:
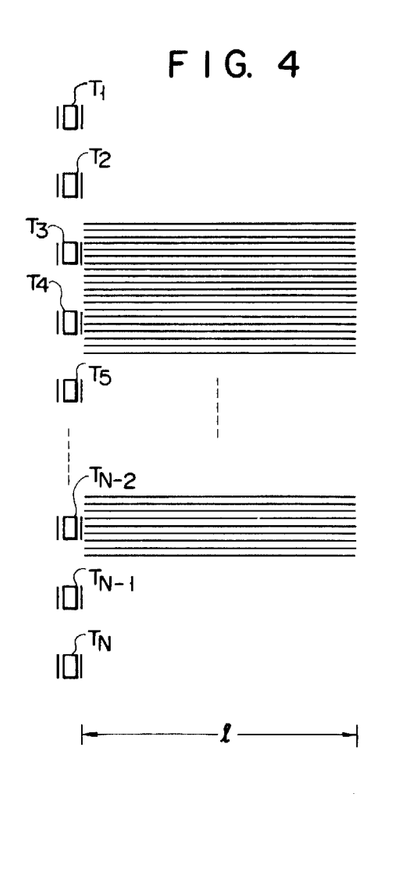
FIG. 4 shows a pattern of scanning lines on a display unit, converted substantially into parallel scanning beams by means of a display device.

In the case of the example shown in FIG. 3, the interval between the beam scanning lines is very small. On a display face of the CRT display device DP, therefore, the inclined scanning lines can be displayed in the form of such equidistant parallel lines as shown in FIG. 4. In this case, it is in the neighbouring region of the wave transmitting faces of the electro-acoustic conversion elements $T_1$ to $T_N$ and in the farthest area from the wave transmitting faces that the largest error is made. In this neighbouring region, however, the sound field distribution takes a complicated form and the sound field extends into a sectional plane having substantially the same area as the vibration face of the element, and on that account any display error is not made. On the other hand, the beams at the farthest area have an extended width of beam, so that the error is also negligible. Since, accordingly, the intervals on the same flat plane between the scanning lines, namely, the intervals between the scanning spots can be made equal to each other, the display method is much simplified, so that the display on, for example, an inexpensive television monitor with a signal processing having a wide range of gradation, on the storage for reproduction into a memory element can be readily effected.

Figures 5, 7:
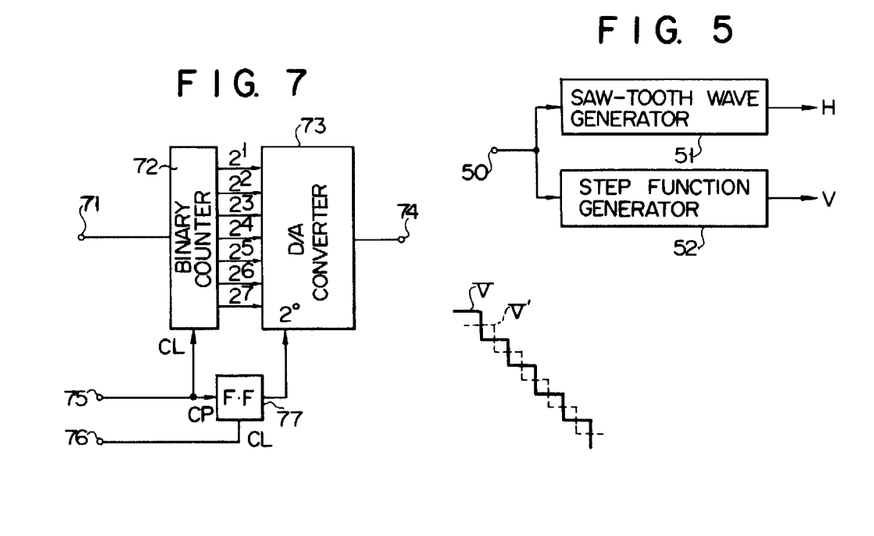
FIGS. 5, 6 and 7 each are a circuit diagram showing a circuit construction for producing horizontal and vertical deflection signals of the display device.

Next, an example of a circuit for making the scanning lines parallel and equidistant as shown in FIG. 4 is explained by reference to FIGS. 5, 6 and 7. FIG. 5 shows the fundamental construction of a circuit for producing a horizontal deflection signal H and vertical deflection signal V for use in the CRT display device DP in cynchronization with the clock pulse from the generator C of FIG. 1, said circuit being provided within the CRT display device DP. A clock pulse having a frequency of, for example, 4 KHz is supplied from the generator C of FIG. 1 to a saw-tooth wave generator 51 and step function generator 52 of FIG. 5 through an input terminal 50. The saw-tooth wave generator 51 is adapted to generate the horizontal deflection signal H, while the step function generator 52 to generate the vertical deflection signal V.

Figure 6:
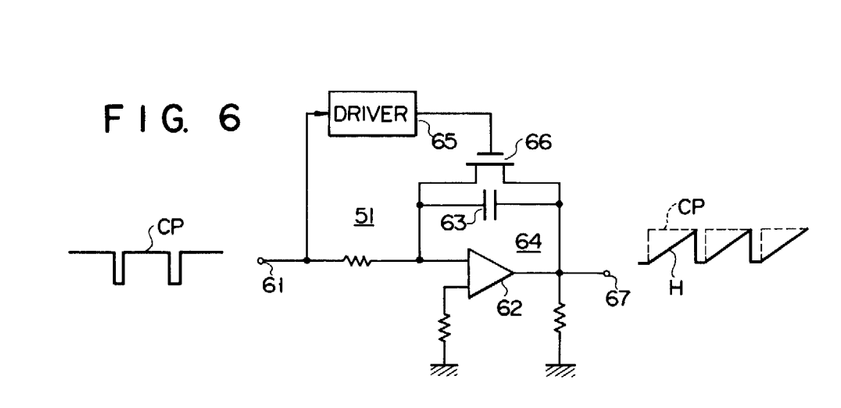

The saw-tooth wave generator 51 is constructed as shown in FIG. 6. Referring to FIG. 6, the clock pulse CP introduced into an input terminal 61 is supplied to an integration circuit 64 composed of an operational amplifier 62 and an integration capacitor 63 and also to a driver 65. The driver 65 is adapted to send a control signal to a gate electrode of an FET switch 66 parallel connected to the integration capacitor 63. The driver 65 supplies an OFF signal during a high level period of the clock pulse CP and an ON signal during a low level period thereof, to the FET switch 66. Since, accordingly, the FET switch 66 is "OFF" during a period in which the clock pulse CP introduced into the input terminal 61 has a high level, the integration circuit 64 integrates that introduced clock pulse CP, so that the potential at an output terminal 67 rises substantially linearly. When the clock pulse CP is varied from high level to low level, the FET switch 66 is turned "ON" to cause the integration capacitor 63 to be discharged through the FET switch 66, so that the potential at the output terminal 67 falls rapidly. The foregoing operation is repeatedly carried out in accordance with the clock pulse from the generator C of FIG. 1 to obtain at the output terminal 67 a saw-tooth wave like horizontal deflection signal H synchronized with the clock pulse CP as shown.

The step function generator 52 is constructed as shown in FIG. 7. A clock pulse CP having a frequency of, for example, 4 KHz, introduced into an input terminal 71 is supplied to a binary counter 72. The binary counter 72 has a counting capacity 128 corresponding in number to, for example, 114 scanning lines of the CRT of the display device DP, and the BCD (Binary-Coded Decimal) numerical value output from the counter 72 is sent into a digital to analog (D/A) converter 73 to obtain at an output terminal 74 an output voltage corresponding to the BCD numerical value. This output is, as shown, a vertical deflection signal V of step function whose voltage is varied by the extent of one step in corresponding relation to one clock pulse.

The step function generator 52 further has a circuit for subjecting the CRT to interlaced scanning. This circuit is composed of a field clear input terminal 75, a frame clear input terminal 76 and a flip-flop 77. The field clear signal fed into the input terminal 75 is introduced into a clock terminal of the flip-flop 77 and also into a clear terminal of the binary counter 72. An output terminal of the flip-flop 77 is connected to a 2° terminal of the D/A converter 73. The flip-flop 77 is cleared by a frame clear signal introduced into the input terminal 76.

First, by a frame clear fed into the input terminal 76 the flip-flop 77 is cleared. When, under this condition, an initial field clear signal is supplied into the input terminal 75, the binary counter 72 is cleared, while the flip-flop 77 is set. As a result, an output signal is supplied from the flip-flop 77 to the 2° terminal of the D/A converter 73 to first obtain at the output terminal 74 an output signal corresponding to the BCD numerical value of 1 from the D/A converter 73. When, under this condition, the first clock pulse is supplied into the terminal 71, an output signal corresponding to a BCD numerical value of 2 is supplied from the binary counter 72 to the D/A converter 73. Since the D/A converter 73 is previously given a BCD numerical value of 1 in accordance with a set output from the flip-flop 77, a voltage signal corresponding to said BCD numerical value of 3 is obtained from the D/A converter 73. When the second clock pulse is given, a voltage signal corresponding to a BCD numerical value of 5 is generated from the D/A converter 73. Similarly, a step voltage V corresponding to an odd BCD numerical value is obtained from the D/A converter 73.

Thus, when one-frame scanning is completed, the flip-flop 77 is reset by the next field clear signal and the binary counter 72 is also cleared. In this condition, the output of the D/A converter 73 corresponds to a BCD numerical value of 0. When, under this condition, the first clock pulse is generated, the binary counter 72 sends a BCD numerical value of 2 to the D/A converter 73 to obtain at the output terminal 74 a voltage signal corresponding to said BCD numerical value of 2. Similarly, when the second clock pulse is given, a voltage signal corresponding to a BCD numerical value of 4 is generated at the output terminal 74. Similarly, a step voltage V' signal corresponding to an even BCD numerical value is obtained from the D/A converter 73. By a combination of the above-obtained two types of step function signals V, V' with horizontal deflection signal H the CRT can be subject to interlaced scanning.

Figure 8:
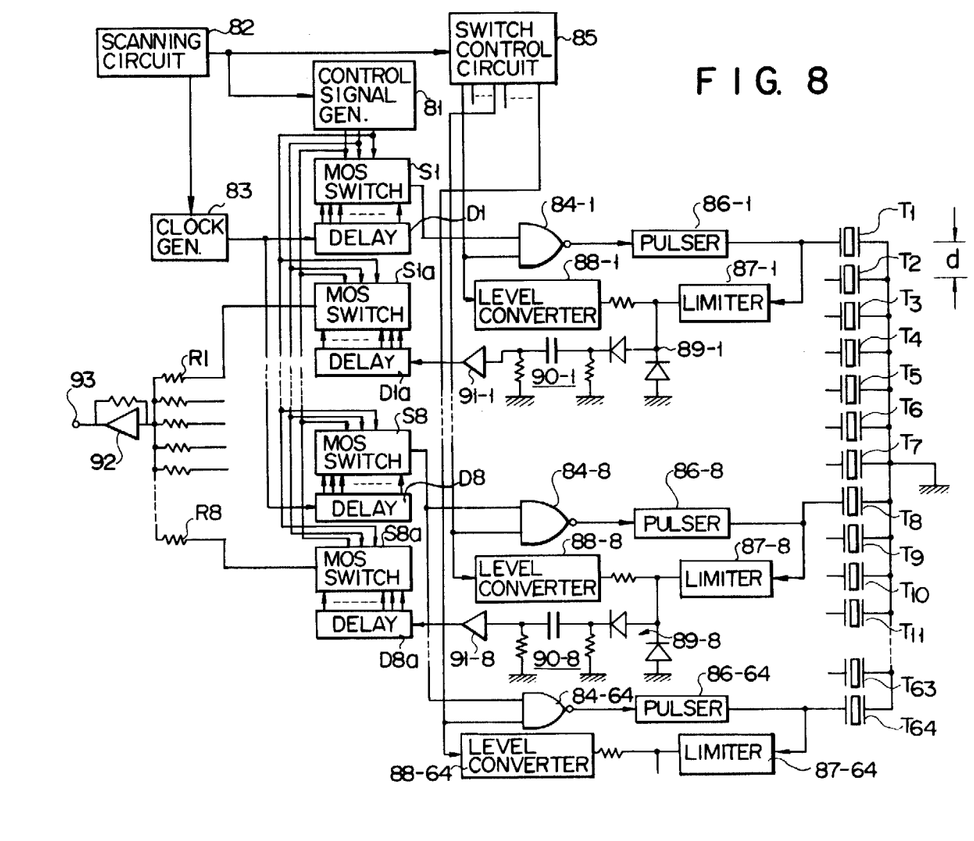
FIG. 8 is a block circuit diagram showing an apparatus according to an embodiment of the invention.

Next, an embodiment of the invention is described in detail with reference to FIG. 8. In FIG. 8, the parts and sections corresponding to those of FIG. 1 are denoted by the same reference numerals. Upon explaining the principle of the invention using FIG. 1, the five delay circuits $D_1$ to $D_5$ were used, but in this embodiment of FIG. 8 use is made of eight delay circuits $D_1$ to $D_8$. Accordingly, the delay circuits $D_1$ to $D_8$ are required to have the delay times varying in 8 stages, respectively. Here in this embodiment, therefore, MOS analog switches $S_1$ to $S_8$ are combined with the delay circuits $D_1$ to $D_8$, respectively, so as to be controlled by a control signal of 3-bit configuration from a control signal generator 81, thereby to set each of the delay circuits $D_1$ to $D_8$ to a desired length of delay time. Suitable as this MOS analog switch is a switch sold under the product No. DG 508 from the SILICONICS INC. of U.S.

When, upon receipt of an output signal from a scanning circuit 82 driven by the clock generator 83, the control signal generator 81 and a clock generator 83 are driven, the first clock pulse is sent from the clock generator 83 to the delay circuits $D_1$ to $D_8$. The delay time of the delay circuits $D_1$ to $D_8$ is so determined that the ultrasonic wave beam equivalently emitted from the electro-acoustic conversion elements $T_1$ to $T_8$ in accordance with the output signal of the MOS switches $S_1$ to $S_8$ may be deflected up to a position of $d/2$ from a point of place spaced by a within-a-main field largest distance l from the element. For example, when it is assumed that the element-to-element's distance $d = 1.5$ mm, $d/2 = 0.75$ mm. The transmitting pulse delayed in the above way is applied from the delay circuits $D_1$ to $D_8$ to one-sided input terminals of NAND gates 84-1 to 84-8, respectively. Supplied to the other input terminals of the NAND gates 84-1 to 84-8 are gate signals from the first to eighth of sixty four output terminals switch control circuits 85 driven by an output from the scanning circuit 82. Thus, the transmitting pulse energizes the electro-acoustic conversion elements $T_1$ to $T_8$ through the NAND gates 84-1 to 84-8 and pulsers 86-1 to 86-8. As a result, the ultrasonic wave beams emitted from the elements $T_1$ to $T_8$ are deflected toward a point spaced by $d/2$ from that corresponding to a center of the front face of the elements $T_1$ to $T_8$ at the maximum range l, and are reflected from that point to return to the elements $T_1$ to $T_8$. The ultrasonic wave beams entered into the elements $T_1$ to $T_8$ are again converted into electrical signals and are introduced into limiters 87-1 to 87-8 for preventing the excessive increase of the input level. The reproduced electrical signals passed through the limiters 87-1 to 87-8 are passed through diode switch circuits 89-1 to 89-8 set to an "ON" state upon receipt of level converters 88-1 to 88-8 driven by an output signal from the switch control circuit 85 and are supplied to capacitor coupling circuits 90-1 to 90-8, and, after amplified by amplifiers 91-1 to 91-8, are sent into receiving delay circuits $D_{1a}$ to $D_{8a}$. The receiving delay circuits $D_{1a}$ to $D_{8a}$ are set, upon receipt of the output signal from the MOS switches $S_{1a}$ to $S_{8a}$, at the same delay times as those at which the transmitting delay circuits $D_1$ to $D_8$ are set. Accordingly, all of the output signals from the delay circuits $D_{1a}$ to $D_{8a}$ become in phase against the wave reflected in the opposite direction to the direction of the transmitted ultrasonic beam and, after summed by a summing circuit comprised of resistors $R_1$ to $R_8$, are amplified by an amplifier 92 to be led out from an output terminal 93. This output terminal 93 is connected to, for example, the receiver W of FIG. 1.

Upon receipt of the next output from the scanning circuit 82, the control signal generator 81 and the switch control circuit 85 are driven, so that the second clock pulse signal is generated from the clock generator 83. As a result, gate signals are supplied from the second to ninth output terminals to the NAND gates 84-2 to 84-9. Note that the delay circuit $D_1$ is connected to the element $T_1$ through the NAND gate 84-1 and also connected on every eighth order to the elements $T_9$, $T_{17}$, $T_{25}$, ... through the NAND gates 84-9, 84-17, 84-25, ..., respectively, though they are not shown. Similarly, the delay circuit $D_2$ is connected to the elements $T_2$, $T_{10}$, $T_{18}$, $T_{26}$, ... through the NAND gates 84-2, 84-10, 84-18, 84-26, ..., respectively. Also similarly, the delay circuit $D_8$ is connected to the elements $T_8$, $T_{16}$, $T_{24}$, ..., $T_{64}$ through the NAND gates 84-8, 84-16, 84-24, ..., 84-64. Accordingly, when the NAND gates 84-2 to 84-9 are opened, the output signals of the delay circuits $D_1$ to $D_8$ are subject to respective specified delays and sent to the elements $T_2$ to $T_9$, respectively. Thus emitted from the elements $T_2$ to $T_9$ are the ultrasonic wave beams deflected by $d/2$ with respect to a straight line perpendicular to the front face of the elements $T_2$ to $T_9$. The ultrasonic wave reflected from the object falling within a range of visual field is again received by the elements $T_2$ to $T_9$ to be led out from the terminal 93 through the receiving delay circuits $D_{1a}$ to $D_{8a}$. Thereafter, similarly, while the ultrasonic wave-emitting element is electrically displaced one by one toward a higher-numbered element through controlling the NAND gates 84-1 to 84-64 by the output of the switch control circuit 85, the above operation is repeatedly carried out until an ultrasonic wave is emitted from the elements $T_{57}$ to $T_{64}$. The foregoing operation corresponds to one field scanning by, for example, any desired odd order scanning line of the interlaced scanning of the CRT explained referring to FIG. 7.

When ultrasonic wave beams are emitted from the electro-acoustic elements $T_{57}$ to $T_{64}$ and again received by the same, all of the delay circuits $D_1$ to $D_8$ and $D_{1a}$ to $D_{8a}$ are so controlled by the output from the control signal generator 81 as to have a delay time opposite to the above case. When, under this condition, gate control is made by the output signal from the switch control circuit 85 so that the gates of the NAND gates 84-1 to 84-64 may be opened in turn eight by eight, ultrasonic wave beams are emitted in turn from the elements $T_1$ to $T_{64}$, respectively, in the direction of $-d/2$ to the ultrasonic wave-emitting faces of the elements $T_1$ to $T_{64}$, and are received by the elements $T_1$ to $T_{64}$. When, in this way, the beam emission and reception with an angle of deflection of $-d/2$ is effected all over the elements $T_1$ to $T_{64}$, the image display corresponding to the received beams is effected on the CRT. The above operation corresponds to the next field scanning by, for example, any desired even order scanning lines of the interlaced scanning of the CRT explained referring to FIG. 7. The foregoing display on the CRT is effected by using the circuits explained with reference to FIGS. 5 and 6 and using equidistant and parallel scanning lines. Therefore, the scanning line to line's interval of a display picture screen corresponding to one frame composed of two fields, resulting from two interlaced scanning, corresponds to half the distance $d$ of adjacent two of the elements $T_1$ to $T_{64}$, namely, $d/2$.

The foregoing description refers to the case where the transmitting pulse from a single clock pulse generator is allotted to a plurality of electro-acoustic conversion elements through a switching circuit. But if the clock pulse generators corresponding in number to the electro-acoustic conversion elements are so set as to have specified phase relations with those elements and are each directly connected to a corresponding one of said those elements, the switching circuit and delay circuit will be able to be omitted. Further, in the above-mentioned embodiment, the ultrasonic wave beam is subject to shift with the angle of deflection kept fixed, and thereafter this angle of deflection is varied. But it is also possible to shift the beam after variation of the angle of deflection.

As above described, according to the invention, there can be obtained an ultrasonic wave transmitting and receiving apparatus capable of effecting the ultrasonic wave beam scanning at an interval smaller than the electro-acoustic conversion element-to-element's distance by the use of a smaller number of elements, thereby not only to simplify the apparatus as a whole but also to increase the resolution of the apparatus.

Though the above-mentioned embodiment performes a combined scan of a linear scan and a sector scan, it is further possible to combine the linear and sector scans with the beam focusing in a visual field of the ultrasonic waves transmitted from a plurality of electro-acoustic conversion element. This is done by giving to individual delay lines a predetermined delay time for focusing the ultrasonic beam in addition to a delay time for performing the linear and sector scan.

What we claim is:

1. An ultrasonic wave transmitting and receiving apparatus comprising an N number of electro-acoustic conversion elements arranged on a flat plane, selectively connecting means for successively energizing each of an M (M<N) number of electro-acoustic conversion elements to transmit ultrasonic waves, means for deflecting ultrasonic wave beam transmitted from said M number of electro-acoustic conversion elements by relatively delaying the input supplied to the M number of elements so that the ultrasonic wave beams emitted respectively from said electro-acoustic conversion elements may be substantially deflected and scanned to such an extent that the centers of the beams do not intersect each other within a range of field to be examined, means for generating an electric signal in accordance with the received ultrasonic wave reflected from an object within the range of field, and means for displaying images in accordance with the electric signal from said last-mentioned means by using equidistant and parallel scanning lines.

2. An ultrasonic wave transmitting and receiving apparatus comprising a plurality of electro-acoustic conversion elements linearly arranged on a flat plane, means for selectively delaying a transmitting electrical signal being supplied to said electro-acoustic conversion elements so that the ultrasonic wave beams emitted respectively from said electro-acoustic conversion elements may be substantially deflected and scanned to such an extent that the centers of the beams do not intersect each other within a range of field to be examined, means for selectively connecting the transmitting electrical signal passed through the delaying means to a selected number of adjacent ones of said plurality of electro-acoustic conversion elements, receiving means including a receiver for receiving the ultrasonic wave beam reflected from an object falling within said field range, through the electro-acoustic conversion elements, to produce a receiving signal, means for delaying the received signals obtained from the respective electro-acoustic conversion elements by the same delay time as in the transmitting operation, and means for displaying a picture image of said object in accordance with a receiving electrical signal from said receiver by using equidistant and parallel scanning lines.

3. An ultrasonic wave transmitting and receiving apparatus according to claim 2, wherein said selectively delaying means includes a plurality of first delay circuits simultaneously supplied with said transmitting signal, a plurality of first MOS switches for controlling the delay time of said first delay circuits, and a control signal generator for supplying a drive signal to said first MOS switches.

4. An ultrasonic wave transmitting and receiving apparatus according to claim 2, wherein said selectively connecting means includes a plurality of NAND gates corresponding in number to said first delay circuits so as to be commonly connected to each other, and a switch control circuit for supplying a gate control signal to said NAND gates.

5. An ultrasonic wave transmitting and receiving apparatus according to Claim 2, wherein said receiving means further includes a plurality of excess input preventing limiters supplied with the receiving signals reproduced by said electro-acoustic conversion elements respectively, diode switch circuits supplied with output signals from said limiters, a level converter for controlling the "ON" and "OFF" operation of said diode switch circuit, amplifiers for amplifying the receiving signals passed through said diode switch circuits, a plurality of second delay circuits supplied with output signals from said amplifiers, a plurality of second MOS switches for controlling the delay time of said second delay circuits in the same manner as in the case of transmission, a control signal generator for supplying a drive signal to said second MOS switches, and means for summing the receiving signals passed through said second delay circuits to send them to said receiver.

6. An ultrasonic wave transmitting and receiving apparatus according to claim 2, wherein said displaying means includes a saw-tooth wave generator for generating a horizontal deflection signal synchronized with said transmitting electrical signal, and means for generating a vertically deflecting step function signal synchronized with said transmitting electrical signal.

7. An ultrasonic wave transmitting and receiving apparatus according to claim 6, wherein said saw-tooth wave generator is composed of an integration circuit including an operational amplifier and an integration capacitor and intended to integrate said transmitting electrical signal, an FET switch connected in parallel to said integration capacitor, and a driver for turning "ON" or "OFF" said FET switch in response to said transmitting electrical signal.

8. An ultrasonic wave transmitting and receiving apparatus according to claim 6, wherein said step function signal generating means includes a binary counter for counting said transmitting electrical signal, and a D/A converter for generating an analog voltage signal corresponding to the counted content of said binary counter.

9. An ultrasonic wave transmitting and receiving apparatus according to claim 8, wherein said step function signal generating means further includes means for introducing an interlaced scanning field signal into a clear terminal of said binary counter, a flip-flop having a clock terminal supplied with said field signal and a clear terminal supplied with a frame signal, and means for introducing an output signal from said flip-flop into an input terminal of said D/A converter, thereby enabling the interlaced scanning to be performed in response to the deflection of the ultrasonic wave beams.

10. An ultrasonic wave transmitting and receiving apparatus according to claim 8, wherein said D/A converter is provided with a number of bits larger by at least one bit than the number of bits of the output signal from the binary counter.

11. An ultrasonic wave transmitting and receiving apparatus according to claim 9, wherein said D/A converter is provided with a number of bits larger by at least one bit than the number of bits of the output signal from the binary counter.

12. An ultrasonic wave transmitting and receiving apparatus according to claim 2, wherein said selectively delaying means further comprises means for giving to the transmitting electrical signal a delay time for transmitting in the range of field the ultrasonic wave transmitted from the plurality of electro-acoustic conversion elements.

* * * * *